United States Patent
Filippone

(10) Patent No.: US 11,393,601 B2
(45) Date of Patent: Jul. 19, 2022

(54) REACTIVITY BOOSTER-QUENCHER, AUTOMATIC POWER MODULES SEPARATOR, AND RELATED METHODS THEREOF

(71) Applicant: Claudio Filippone, College Park, MD (US)

(72) Inventor: Claudio Filippone, College Park, MD (US)

(73) Assignee: CARBON FREE HOLDINGS LLC, College Park, MD (US)

(*) Notice: Subject to any disclaimer, the term of this patent is extended or adjusted under 35 U.S.C. 154(b) by 0 days.

(21) Appl. No.: 16/973,132

(22) PCT Filed: Jun. 10, 2019

(86) PCT No.: PCT/US2019/036425
§ 371 (c)(1),
(2) Date: Dec. 8, 2020

(87) PCT Pub. No.: WO2020/005526
PCT Pub. Date: Jan. 2, 2020

(65) Prior Publication Data
US 2021/0257118 A1  Aug. 19, 2021

Related U.S. Application Data

(60) Provisional application No. 62/682,834, filed on Jun. 8, 2018.

(51) Int. Cl.
*G21C 1/30* (2006.01)
*G21D 3/16* (2006.01)
(Continued)

(52) U.S. Cl.
CPC ............ *G21D 3/16* (2013.01); *G21C 1/30* (2013.01); *G21C 7/08* (2013.01); *G21C 7/34* (2013.01)

(58) Field of Classification Search
CPC ... G21D 5/02; G21D 3/16; G21C 1/30; G21C 1/32; G21C 3/322; G21C 3/38; G21C 7/30; G21G 4/02
(Continued)

(56) References Cited

U.S. PATENT DOCUMENTS 3,364,122 A   1/1968  Mombazet et al.
3,523,869 A   8/1970  Hilborn
(Continued)

FOREIGN PATENT DOCUMENTS

WO   WO-2016164935 A1 * 10/2016 .............. G21C 7/30

*Primary Examiner* — Jack W Keith
*Assistant Examiner* — Joshua C Devorkin
(74) *Attorney, Agent, or Firm* — Millburn IP PLLC

(57) ABSTRACT

A nuclear power reactor may include a plurality of power modules, each including a nuclear fuel and a power conversion system configured to convert heat generated from the nuclear fuel to electricity, where the nuclear fuel of the plurality of power modules collectively forms a reactor core. The nuclear power reactor may also include a sleeve being disposed between the plurality of power modules, where the sleeve has a first end and a second end opposite to the first end. The nuclear power reactor may further include a reactivity booster having a neutron source and a reactivity quencher having a neutron absorber. The reactivity booster may be movable between a first location adjacent the first end of the sleeve and a second location adjacent the reactor core, and the reactivity quencher may be movable between a third location adjacent the second end and the second location adjacent the reactor core.

16 Claims, 5 Drawing Sheets

(51) Int. Cl.
*G21C 7/08* (2006.01)
*G21C 7/34* (2006.01)

(58) Field of Classification Search
USPC .......................... 376/317, 212, 909, 910, 911
See application file for complete search history.

(56) References Cited

U.S. PATENT DOCUMENTS

| | | | |
|---|---|---|---|
| 4,208,247 A * | 6/1980 | Impink, Jr. .............. | G21C 7/34 376/191 |
| 2013/0028364 A1 | 1/2013 | Rubbia | |
| 2015/0098544 A1 | 4/2015 | Blanovsky | |
| 2018/0090237 A1 | 3/2018 | Filippone | |

* cited by examiner

REACTIVITY BOOSTER-QUENCHER, AUTOMATIC POWER MODULES SEPARATOR, AND RELATED METHODS THEREOF

RELATED APPLICATIONS

This application is a U.S. National Stage Application of PCT International Application No. PCT/US19/36425 filed on Jun. 10, 2019, which claims the benefit of priority to U.S. Provisional Application No. 62/682,834, filed on Jun. 8, 2018, which is hereby incorporated by reference in its entirety.

FIELD OF THE INVENTION

The present invention relates generally to a nuclear power reactor and related methods thereof. More specifically, particular embodiments of the present disclosure may relate to various nuclear reactivity control and safety shutdown mechanisms.

DESCRIPTION OF RELATED ART

Controlling nuclear reactivity is one of the most critical aspects of operating a nuclear power reactor. This is even more so when the nuclear power reactor is expected to operate in various transient conditions and/or relatively frequent power output variations.

For example, the inventor of the present disclosure has previously proposed a nuclear reactor design (Holos™) composed of a plurality of subcritical power modules that are configured to move relative to one another as a primary mechanism to control the reactivity of the reactor. This reactor design may enable fully autonomous operation of the reactor with its power output directly proportional to the electrical load, which may vary from substantially zero power to the full power.

When a nuclear reactor is expected to operate in such a transient condition (e.g., power adjustment, reactor shutdown, and reactor restart), one of the problems that may be taken into account is the effect of fission product neutron poisoning, in particular from Xe-135 isotope. Xenon-135 is a fission product of U-235 with a very high neutron-capture cross section (2-3 million barns) and a half-life of about 9.2 hours. Due to its high neutron-capture capacity, Xe-135 and Sm-149 can detrimentally affect a nuclear reactor's ability to restart or increase power, and a reactor must be designed to mitigate or overcome this neutron-poisoning effect.

SUMMARY

While the reactivity control mechanisms in the Holos™ reactor design are believed to be adequate to mitigate the neutron poisoning effect, it may be beneficial to implement one or more independent and redundant reactivity control mechanisms. Moreover, it may be beneficial to implement one or more related safety features that can independently cause immediate shutdown of the reactor.

To attain the advantages and in accordance with the purpose of the invention, as embodied and broadly described herein, one aspect of the invention provides a nuclear power reactor comprising a plurality of power modules, each comprising a nuclear fuel and a power conversion system configured to convert heat generated from the nuclear fuel to electricity. The nuclear fuel of the plurality of power modules collectively form a reactor core. The reactor may also comprise a sleeve being disposed between the plurality of power modules, where the sleeve has a first end and a second end opposite to the first end. In various exemplary embodiments, the reactor comprises a reactivity booster comprising a neutron source and being movable between a first location adjacent the first end of the sleeve and a second location adjacent the reactor core. Alternatively or additionally, the reactor may include a reactivity quencher comprising a neutron absorber and being movable between a third location adjacent the second end and the second location adjacent the reactor core.

According to another exemplary aspect, each of the power modules may comprise a sealed housing enclosing the nuclear fuel and the power conversion system therein.

In yet another exemplary aspect, the reactor may comprise a fuel cartridge configured to enclose the nuclear fuel, the fuel cartridge comprising an inlet and an outlet through which a coolant flows in and out, respectively, of the fuel cartridge. The power conversion system may comprise a compressor turbine proximal to the inlet of the fuel cartridge and a power turbine distal to the outlet of the fuel cartridge.

In one exemplary aspect, the plurality of power modules may be configured to move relative to one another to control a criticality of the reactor core.

According to another exemplary aspect, the reactor may comprise a support frame to which the plurality of power modules are movably connected, wherein the sleeve is connected. In yet another exemplary aspect, a radiation shield may be provided to cove the first end of the sleeve. In still yet another exemplary aspect, the reactivity booster may comprise an internal recess adapted to receive the reactivity booster.

Some exemplary aspects consistent with the present disclosure may provide a module separator having a first end coupled to the sleeve and a second end coupled to one of the plurality of power modules. The module separator may be configured to extend so as to cause the one of the plurality of power modules to move away from the sleeve. In one exemplary embodiment, the module separator may comprise a piston-cylinder assembly. The module separator may be automatically actuated upon a parameter of the reactor core exceeding a predetermined value.

Another aspect of the present invention is to provide a nuclear power reactor comprising a support frame, a plurality of power modules movably connected to the support frame, each of the plurality of power modules comprising a nuclear fuel and a power conversion system configured to convert heat generated from the nuclear fuel to electricity, where the nuclear fuels of the plurality of power modules collectively form a reactor core. The reactor may also comprise a sleeve disposed between the plurality of power modules, where the sleeve is structurally connected to the support frame. The reactor may further comprise a reactivity booster movably disposed in the sleeve between a first location outside of the reactor core and a second location adjacent the reactor core. The reactivity booster may be adapted to provide a positive nuclear reactivity to the reactor core.

According to another exemplary aspect, each of the power modules may comprise a sealed housing enclosing the nuclear fuel and the power conversion system therein.

In yet another exemplary aspect, the reactor may comprise a fuel cartridge configured to enclose the nuclear fuel, where the fuel cartridge may comprise an inlet and an outlet through which a coolant flows in and out, respectively, of the fuel cartridge. According to still yet another exemplary aspect, the reactor may further comprise a radiation shield covering at least the first location.

In some exemplary aspects, the reactor may further comprise a module separator having a first end coupled to the sleeve and a second end coupled to one of the plurality of power modules, where the module separator may be configured to extend to cause the one of the plurality of power modules away from the sleeve. The module separator may be automatically actuated upon a parameter of the reactor core exceeding a predetermined value.

According to still another exemplary aspect, a nuclear power reactor having a support frame, a plurality of power modules movably connected to the support frame, and a sleeve disposed between the plurality of power modules is provided. Each of the plurality of power modules may comprise a nuclear fuel and a power conversion system configured to convert heat generated from the nuclear fuel to electricity, where the nuclear fuels of the plurality of power modules collectively form a reactor core. The sleeve may be structurally connected to the support frame. The nuclear power reactor may comprise a reactivity quencher movably disposed in the sleeve between a first location outside of the reactor core and a second location adjacent the reactor core, where the reactivity quencher is configured to provide a negative nuclear reactivity to the reactor core.

According to some exemplary aspects, the reactor may comprise a reactivity booster movably disposed in the sleeve between a third location outside of the reactor core and the second location adjacent the reactor core, where the reactivity booster comprises an internal recess adapted to receive the reactivity booster.

The reactor may comprise a module separator having a first end coupled to the sleeve and a second end coupled to one of the plurality of power modules, where the module separator is configured to extend to cause the one of the plurality of power modules away from the sleeve.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EXEMPLARY EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Figure 3:
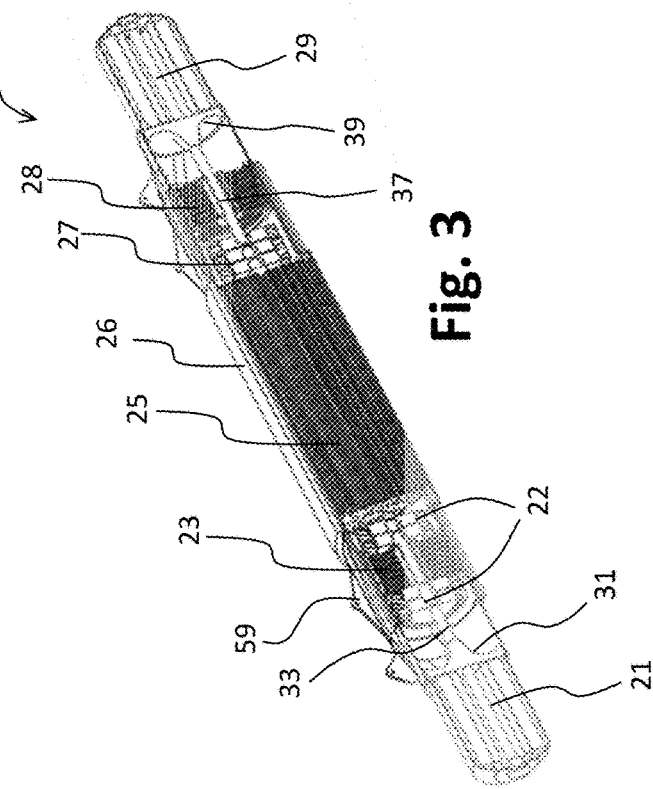
FIG. 3 is a perspective, cross-sectional view of the subcritical power module illustrating various internal components, according to one exemplary embodiment.
Figure 2:
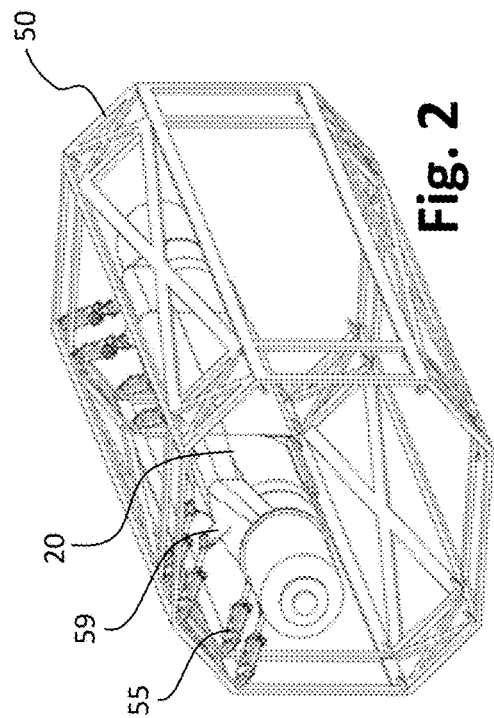
FIG. 2 is a perspective view of the nuclear power reactor shown in FIG. 1, but showing only one of the plurality of subcritical power modules inside the support structure for clarity.
Figure 1:
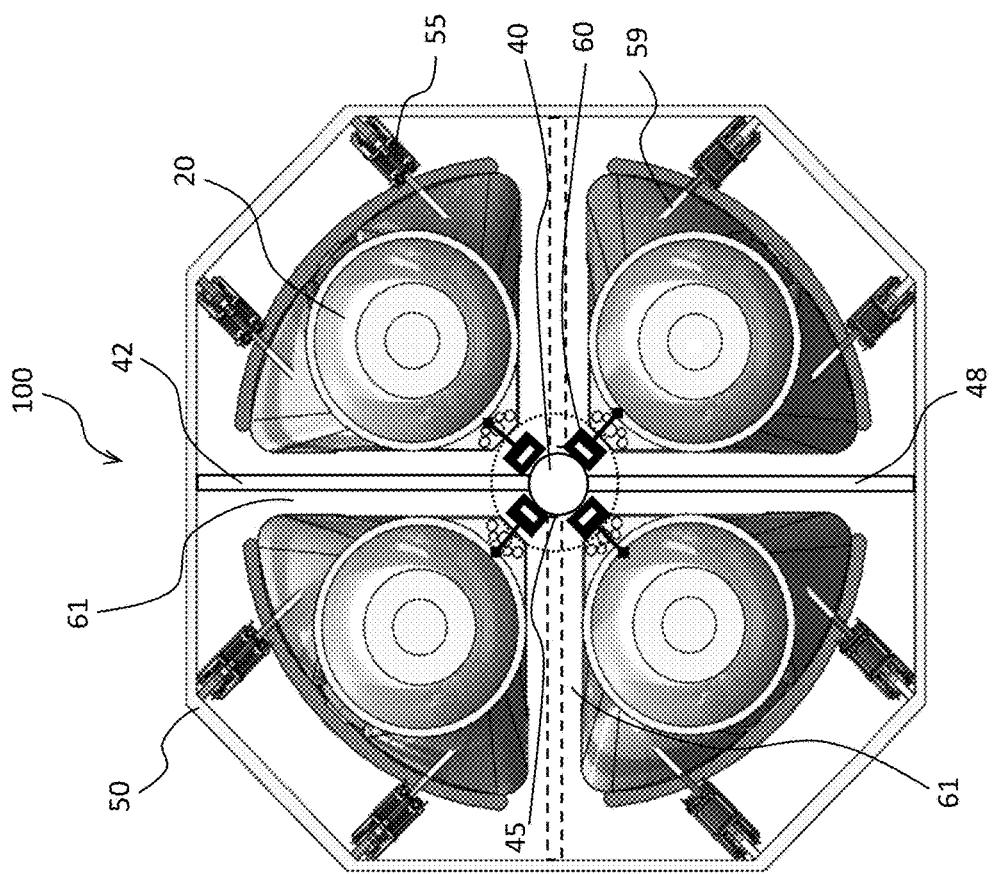
FIG. 1 is a frontal view of an operational nuclear power reactor with a plurality of subcritical power modules mounted in a support structure, according to one exemplary embodiment of the present disclosure.

According to one exemplary embodiment of the present disclosure, FIGS. 1-3 illustrate a nuclear power reactor 100 having a plurality of subcritical power modules 20 that together form an operational nuclear power system. As shown in FIG. 3, each subcritical power module 20 includes a substantially sealed housing and contains therein a fuel cartridge 25 with suitable nuclear fuel (e.g., TRISO fuel particles in compacts) and a power conversion system configured to convert heat generated from fuel cartridge 25 to electricity. The sealed housing may be made of a suitable radiation shielding material. Subcritical power module 20 may also include a radiation shield and/or reflector 26 disposed adjacent to fuel cartridge 25.

The power conversion system may include a motor 21, a compressor turbine 22, and an intercooler heat exchanger 23 on the front end side of fuel cartridge 25, and a power turbine 27, a recuperator heat exchanger 28, and a generator 29 on the back end side of fuel cartridge 25. Motor 25 is formed by a motor stator/rotor assembly and is configured to drive compressor turbine 22 by being coupled to a motor shaft 33 of motor 21. Compressor turbine 22 may include stages of low- and high-pressure compressor turbines. The working fluid flowing through the low- and high-pressure compressor turbines is thermally coupled to intercooler heat exchanger 23, such that the working fluid cools down while being compressed and flown through fuel cartridge 25. As the working fluid flows through fuel cartridge 25, it heats up by the heat generated from the nuclear fuel and expands in power turbine 27.

After expansion in power turbine 27, the working fluid flows through recuperator heat exchanger 28 to transfer its energy content to a secondary working fluid flowing therethrough. Generator 29 is formed by a generator stator/rotor assembly, and recuperator heat exchanger 28 is coupled to a generator shaft 37 of generator 29. After passing through recuperator heat exchanger 28, the working fluid reverses its flow direction via a distal volute 39 and flows through internal conduits (not shown) formed around fuel cartridge 25 and then towards a proximal volute 31. Another recuperator or thermal rejection heat exchanger (not shown) may be disposed in the internal conduits to further transfer its energy content before it undergoes another flow reversal via proximal volute 31 and resets the thermodynamic cycle.

More detailed descriptions of various components of subcritical power module 20 can be found in, for example, U.S. patent application Ser. No. 15/565,164, filed Apr. 12, 2016, and PCT international application no. PCT/US18/033979, filed May 22, 2018, the entire disclosures of which are expressly incorporated herein by reference.

Referring to FIG. 1, each of subcritical power modules 20 is movably connected to a support frame 50 (e.g., exoskeleton structure) via a plurality of movement controllers 55, such that each of subcritical power modules 20 can move axially and/or radially with respect to one another. Support frame 50 is configured to fit inside a transport platform, such as, for example, an intermodal container, and is configured to provide structural support to the plurality of subcritical power modules 20.

A plurality of movement controllers 55 may be disposed symmetrically in support frame 50, and each movement controller 55 has one end connected to support frame 50 and the other end connected to a module coupler 59 of subcritical power module 20. Movement controllers 55 can move each subcritical power module 20 in all three-dimensional directions (e.g., axial and radial directions) while adequately supporting the weight of subcritical power module 20. Movement controller 55 may include a suitable actuator (e.g., mechanical linear actuator). For example, a suitable actuator can be a hydraulic piston-cylinder assembly.

Movement controllers 55 are configured to receive control signals and energy sources (e.g., in the form of electrical, electro-mechanical, and/or hydraulic power) regulated by a suitable controller (not shown) and can actuate linear, rotatory, or oscillatory motion of subcritical power modules 20. Since movement controllers 55 are actively controlled, they can provide active shock absorbing during transport of subcritical power modules 20 to protect subcritical power modules 20 from vibratory and shock stresses.

Subcritical power modules 20 are configured such that the nuclear fuel contained in fuel cartridges 25 may remain in a subcritical state when at least one subcritical power module 20 is positioned away from other subcritical power modules 20 by a predetermined distance and reach a critical state when all of the subcritical power modules 20 are positioned proximate to one another, thus forming a compact, critical core. The capability to move at least one of subcritical power modules 20 with respect to one or more of other subcritical power modules 20 enables the control of the geometric and material buckling necessary to achieve critical, supercritical, or subcritical condition of the nuclear fuel inside fuel cartridge 25. For example, each subcritical power module 20 can be moved to cause alignment or misalignment to satisfy or dissatisfy the geometric and material buckling requirements to sustain chain reactions without the need to insert control rods into fuel cartridge 25 of subcritical power module 20.

According to another exemplary aspect, nuclear power reactor 100 may include a secondary reactivity control mechanism 40 that can selectively provide a reactivity booster by causing a positive reactivity insertion to the core formed by the coupled subcritical power modules 20 or, as a safety shutdown mechanism, a reactivity quencher by causing a negative reactivity insertion to the core formed by the coupled subcritical power modules 20. For example, as shown in FIGS. 1 and 4-7, reactivity control mechanism 40 may be located in the center region of the reactor core collectively formed by fuel cartridges 25 of subcritical power modules 20 (hereinafter referred to as a neutron-coupled "reactor core"). Reactivity control mechanism 40 may include an elongated sleeve 45 extending along a longitudinal axis of subcritical power modules 20 between a first end 43 proximal to fuel cartridge 25 and a second end 47 distal to fuel cartridge 25.

Fuel cartridge 25 may include a plurality of fuel blocks (e.g., graphite blocks) having a plurality of fuel channels for receiving the nuclear fuel. The fuel blocks can be clustered side by side in a layer and/or stacked on top of one another to form a desired shape of fuel cartridge 25 and the reactor core. For example, as shown in FIGS. 4-7, each fuel cartridge may have a shape of quadrasphere (i.e., a quarter of a sphere), so that the reactor core collectively formed by four subcritical power modules has a shape of a sphere. In another exemplary embodiment, each fuel cartridge may have a shape of a quarter cylinder, so that the reactor core has a shape of a cylinder.

Sleeve 45 may be connected to support frame 50 via a plurality of support bars 42 and 48, as shown in FIG. 1. Although FIG. 1 illustrates vertical support bars 42 and 48 only, it should be understood that any number and configuration of support bars may be possible, including support bars extending horizontally between sleeve 45 and support frame 50, so long as such support bars do not interfere with the movement of subcritical power modules 20. The support bars extending horizontally can be reinforced with additional support bars extending vertically. Horizontal and vertical support bars can be formed by neutron absorbing materials to shield neutrons streaming through gaps 61 formed by subcritical power modules 20 with respect to one another while being actuated. In one exemplary embodiment, sleeve 45 may be configured to be removed during operation of nuclear power reactor 100.

Figure 4:
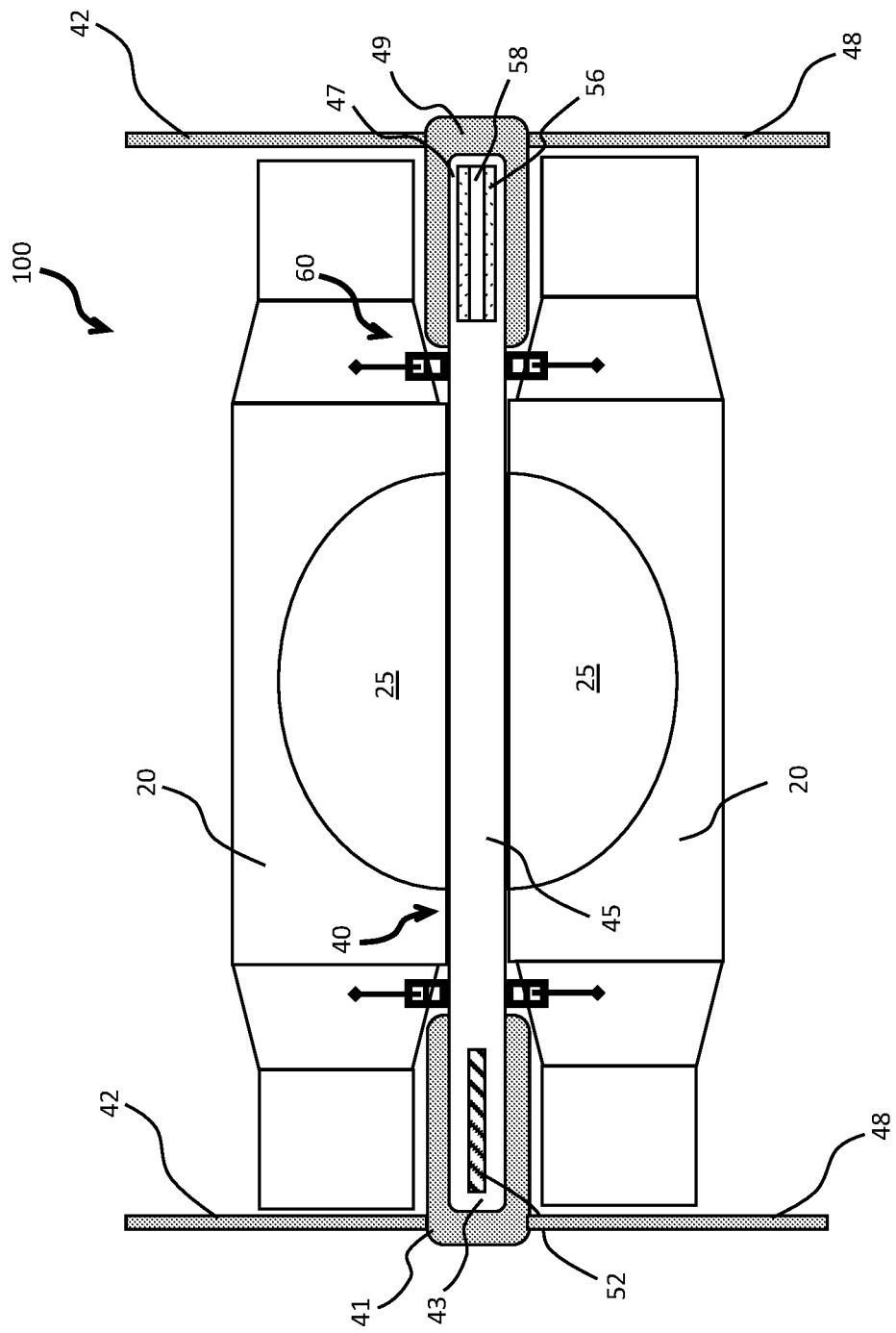
FIG. 4 is a functional, cross-sectional view of a nuclear power reactor, illustrating a reactivity control mechanism and a plurality of module separators.

Reactivity control mechanism 40 may include a reactivity booster 52 and a reactivity quencher 56, both movably disposed inside sleeve 45, as shown in FIG. 4. By way of examples only, reactivity booster 52 may comprise any primary or secondary neutron source material, such as, for example, californium, plutonium-beryllium, or antimony-beryllium neutron source. Alternatively or additionally, reactivity booster 52 may comprise a suitable neutron reflector material, such as, for example, beryllium carbide, tungsten carbide, and zirconium silicide material. Reactivity quencher 56 may comprise any neutron poison material, such as, for example, hafnium. In some exemplary embodiments, sleeve 45 may provide an access opening that can be used to replace reactivity booster 52 or reactivity quencher 56.

Reactivity booster 52 may be configured to introduce sufficient positive reactivity during startup and restart of nuclear reactor 100, and reactivity quencher 56 may be configured to introduce sufficient negative reactivity to cause immediate shutdown of nuclear power reactor 100 and maintain the shutdown condition even when subcritical power modules 20 are positioned closest to one another, for example during transport.

In a default or unactuated state, reactivity booster 52 may be positioned near first end 41 outside of the reactor core, and reactivity quencher 56 may be positioned near second end 47 outside of the reactor core, as shown in FIG. 4, which depicts a normal operating condition of nuclear power reactor 100 with all of subcritical power module 20 positioned sufficiently close together to reach a critical condition. First end 43 and second end 47, at least the portions that are intended to receive reactivity booster 52 and reactivity quencher 56, respectively, may be covered with suitable radiation shields 41 and 49, respectively.

Reactivity quencher 56 may include an internal recess 58 sized and adapted to receive reactivity booster 52, as shown in FIG. 4. This is a safety feature that accounts for situations where reactivity booster 52 malfunctions or is stuck in the central region of the reactor core, interfering with the operation of reactivity quencher 56. As will be described later with reference to FIG. 7, reactivity quencher 56 may be configured to receive reactivity booster 52 inside recess 58 to nullify the positive reactivity of reactivity booster 52 and cause reactor shutdown.

Figure 5:
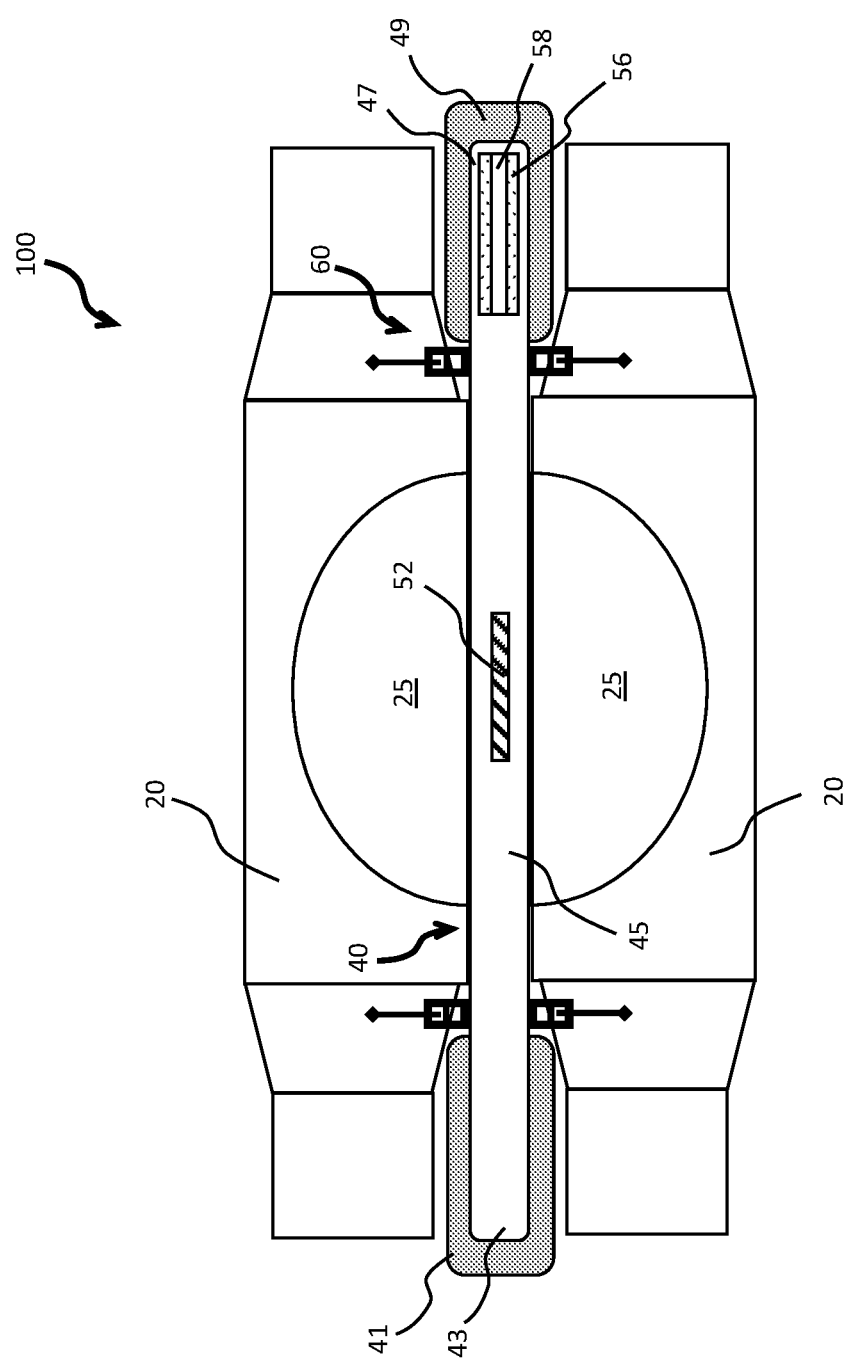
FIG. 5 is a functional, cross-sectional view of the nuclear power reactor of FIG. 4, illustrating the reactivity control mechanism in a reactivity booster mode.
Figure 6:
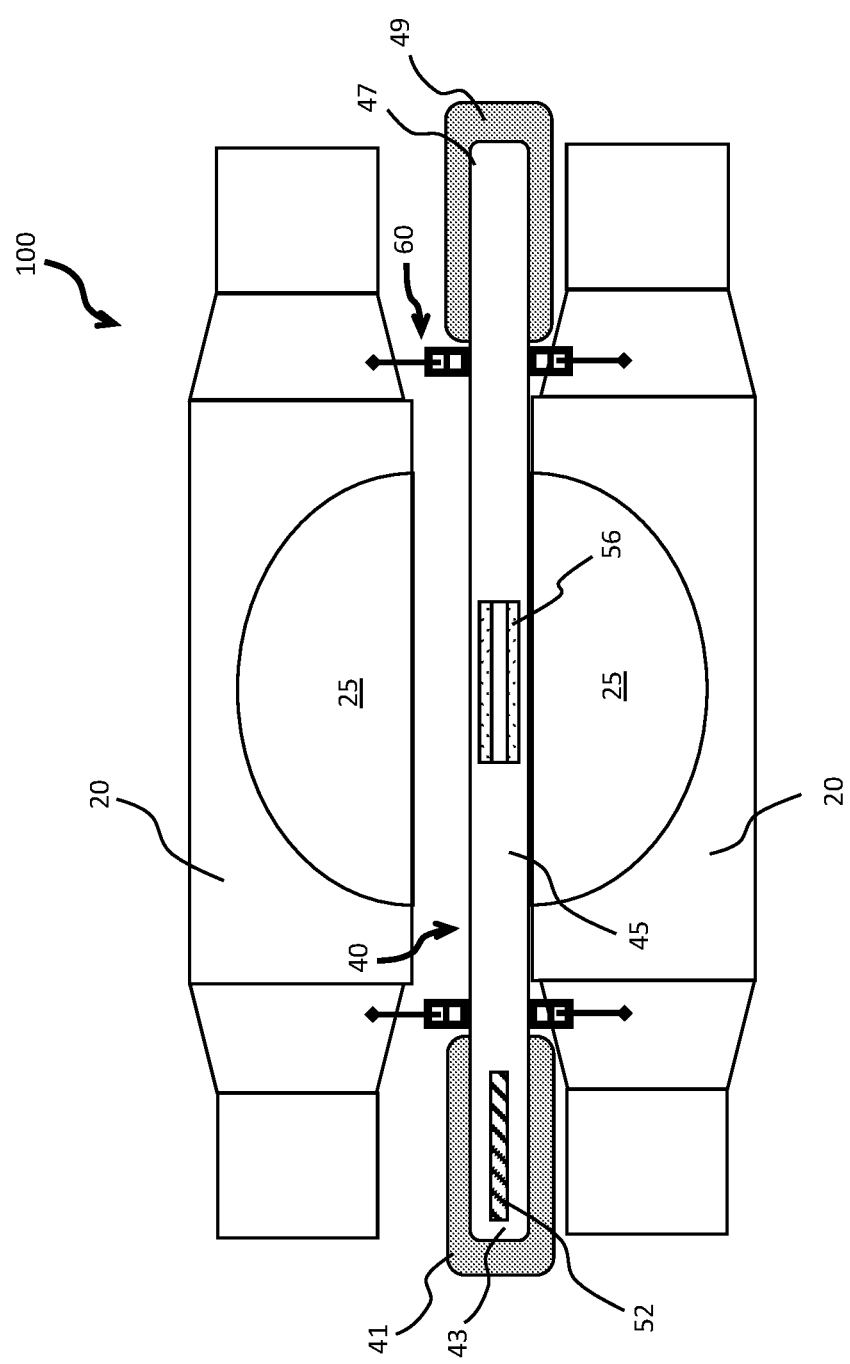
FIG. 6 is a functional, cross-sectional view of the nuclear power reactor of FIG. 4, illustrating the reactivity control mechanism in a reactivity quencher mode and module separators partially actuated.
Figure 7:
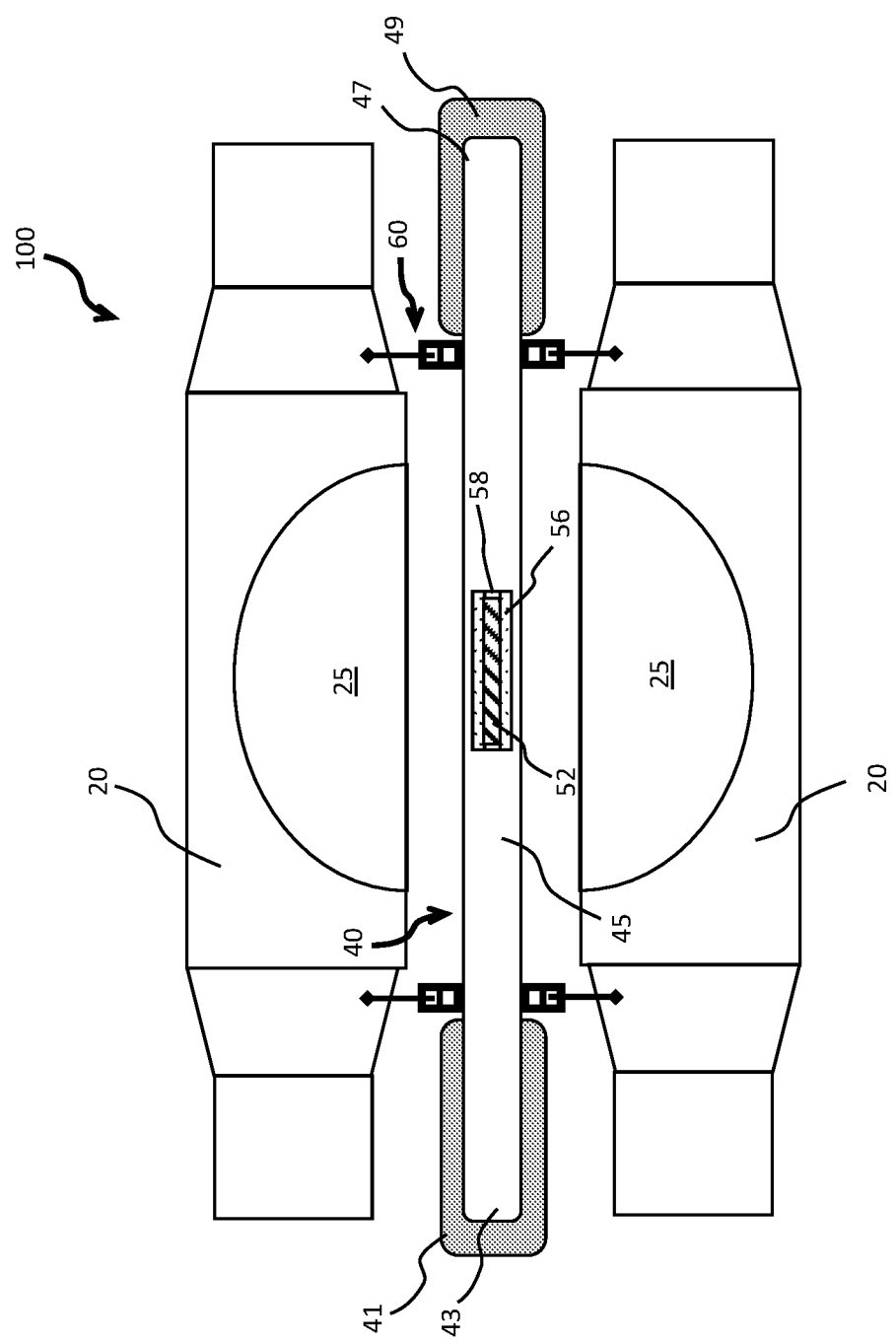
FIG. 7 is a functional, cross-sectional view of the nuclear power reactor of FIG. 4, illustrating the reactivity control mechanism in a safety shutdown mode with the module separators fully actuated.

Reactivity control mechanism 40 may include a suitable booster driver (not shown) that can move reactivity booster 52 between its normal location near first end 41 and a desired location inside the core region (e.g., substantially the center of the reactor core, as shown in FIG. 5). Reactivity control mechanism 40 may also include a suitable quencher driver (not shown) that can move reactivity quencher 56 between its normal location near second end 47 and a desired location inside the core region (e.g., substantially the center of the reactor core, as shown in FIGS. 6 and 7). By way of example, suitable booster or quencher drivers may include a hydraulically- or magnetically-driven slider, a mechanical or electro-mechanical pushrod, a rack-gear driver, or any other driver mechanism known in the art. The booster driver and the quencher driver may be configured to operate independently or in concert with one another.

According to another exemplary aspect of the present disclosure, nuclear power reactor 100 may provide a plurality of module separators 60 that are configured to physically separate subcritical power modules 20 from one another by a sufficient distance to induce a reactor shutdown condition. For example, as shown in FIGS. 1 and 4, module separators 60 may include a welded-shut piston-cylinder assembly having a first end connected to sleeve 45 and a second end connected to one of subcritical power modules 20. In some exemplary embodiments where reactivity control mechanism 40 is not provided, module separators 60 may be connected between two neighboring subcritical power modules 20. The piston-cylinder assembly may contain a suitable fluid that can passively expand in response to its temperature exceeding a threshold value or it can be mechanically actively driven to extend or retract according to programmed positions.

For example, module separators 60 may be configured such that, when the operating temperature of nuclear power reactor 100 exceeds an abnormally-high threshold temperature, the fluid inside the piston-cylinder assembly expands, breaks the weld, and pushes the piston away from the cylinder, causing subcritical power modules 20 to move away from the center of the reactor core and away from one another. The separation of subcritical power modules 20 causes nuclear power reactor 100 to fall into a subcritical, shutdown condition. Accordingly, in one configuration, module separators 60 are an automatically-actuated, passive safety mechanism that can operate to independently shutdown nuclear power reactor 100 when the controller for movement controllers 55 fails or malfunctions or even when reactivity control mechanism 40 fails with reactivity booster 52 stuck at a center region of the reactor core (which will be described later with reference to FIG. 7). In another configuration, module separators 60 are actively actuated, through a safety mechanism and control system that can operate to independently shutdown nuclear power reactor 100 when the controller for movement controllers 55 fails or malfunctions or even when reactivity control mechanism 40 fails with reactivity booster 52 stuck at a center region of the reactor core (which will be described later with reference to FIG. 7). In some exemplary embodiments, module separators 60 may also be actuated through external actuators to force a shutdown condition.

In another exemplary embodiment, module separator 60 may be formed by a suitable metal alloy or a liquid metal that expand as a result of increasing temperature, such that, when the temperature of module separators 60 exceeds a predetermined threshold value, the metal alloy begins to expand and push sleeve 45 and subcritical power module 40 away from each other. Any other mechanism known in the art that can be passively actuated to cause expansion can be used alternatively or additionally.

In another exemplary embodiment, the actuation of module separators 60 can be triggered by an actuation signal transmitted by a controller. For example, the controller may monitor one or more parameter that indicates the condition of the reactor core (e.g., neutron flux, temperature, and pressure) and, upon detection of an abnormal condition, transmit the actuation signal to one or more module separators 60 to cause movement of respective subcritical power modules 20 away from sleeve 45.

With reference to FIGS. 5-7, exemplary operations of reactivity control mechanism 40 and module separators 60, consistent with various exemplary aspects of the present disclosure, are described. FIG. 5 illustrates a reactivity booster mode, according to one exemplary embodiment, where reactivity booster 52 is positioned in the central region of the reactor core. In this mode, reactivity booster 52 provides a desired amount of positive reactivity to the reactor core to cause or sustain criticality of nuclear power reactor 100.

FIG. 6 illustrates a reactivity quencher mode, according to one exemplary embodiment, where reactivity quencher 56 is positioned in the central region of the reactor core. In this mode, reactivity quencher 56 provides a desired amount of negative reactivity to the reactor core to cause or sustain sub-criticality of nuclear power reactor 100. FIG. 6 also illustrates at least one group of module separators 60 (i.e., those that are connected to upper subcritical power module 20) being actuated to separate the upper subcritical power module 20 away from sleeve 45 and to further contribute to the sub-criticality of nuclear power reactor 100.

FIG. 7 illustrates a safety shutdown mode with reactivity quencher 56 positioned in the central region of the reactor core and with all of module separators 60 fully actuated to separate subcritical power modules 20 from one another. FIG. 7 also illustrates an abnormal condition where reactivity booster 52 is stuck in the central portion of the reactor core and reactivity quencher 56 is activated to receive and surround reactivity booster 52. Reactivity quencher 56 surrounding reactivity booster 52 can be sufficient to effectively suppress or counter-balance the positive reactivity from reactivity booster 52 and cause the shutdown of nuclear power reactor 100.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A nuclear power reactor comprising:
   a support frame;
   a plurality of power modules disposed within the support frame, each comprising a nuclear fuel and a power conversion system configured to convert heat generated from the nuclear fuel to electricity, the nuclear fuels of the plurality of power modules collectively forming a reactor core;
a sleeve connected with the support frame and disposed between the plurality of power modules, the sleeve having a first end portion, a central portion, and a second end portion;
a reactivity booster comprising a neutron source and being movable between the first end portion and the central portion of the sleeve;
a reactivity quencher comprising a neutron absorber and being movable between the second end portion and the central portion of the sleeve;
a plurality of movement controllers connected to the support frame and the plurality of power modules; and
a plurality of module separators each connected to the sleeve and one of the plurality of power modules and extendable to move the one of the plurality of power modules away from the sleeve.

2. The nuclear power reactor of claim 1, wherein each of the power modules comprises a sealed housing enclosing the nuclear fuel and the power conversion system therein.

3. The nuclear power reactor of claim 1, further comprising a fuel cartridge configured to enclose the nuclear fuel, the fuel cartridge comprising an inlet and an outlet through which a coolant flows in and out, respectively, of the fuel cartridge.

4. The nuclear power reactor of claim 3, wherein the power conversion system comprises a compressor turbine proximal to the inlet of the fuel cartridge and a power turbine distal to the outlet of the fuel cartridge.

5. The nuclear power reactor of claim 1, wherein the movement controllers and the module separators are configured to move the plurality of power modules relative to one another to control a criticality of the reactor core.

6. The nuclear power reactor of claim 1, further comprising a radiation shield covering the first end portion of the sleeve.

7. The nuclear power reactor of claim 1, wherein the reactivity quencher comprises an internal recess adapted to receive the reactivity booster.

8. The nuclear power reactor of claim 1, wherein the module separator comprises a piston-cylinder assembly.

9. The nuclear power reactor of claim 1, wherein the module separator is automatically actuated when a parameter of the reactor core exceeds a predetermined value.

10. A nuclear power reactor comprising:
a support frame;
a plurality of power modules movably connected to the support frame through a plurality of movement controllers, each of the plurality of power modules comprising a nuclear fuel and a power conversion system configured to convert heat generated from the nuclear fuel to electricity, the nuclear fuels of the plurality of power modules collectively forming a reactor core;
a sleeve disposed between the plurality of power modules, the sleeve being structurally connected to the support frame;
a reactivity booster movably disposed in the sleeve and movable along the sleeve between an end portion and a central portion of the sleeve, the reactivity booster being adapted to provide a positive nuclear reactivity to the reactor core; and
a plurality of module separators each connected to the sleeve and one of the plurality of power modules and extendable to move the one of the plurality of power modules away from the sleeve.

11. The nuclear power reactor of claim 10, wherein each of the power modules comprises a sealed housing enclosing the nuclear fuel and the power conversion system therein.

12. The nuclear power reactor of claim 10, further comprising a fuel cartridge configured to enclose the nuclear fuel, wherein the fuel cartridge comprises an inlet and an outlet through which a coolant flows in and out, respectively, of the fuel cartridge.

13. The nuclear power reactor of claim 10, further comprising a radiation shield covering at least the end portion.

14. The nuclear power reactor of claim 10, wherein the module separator is automatically actuated when a parameter of the reactor core exceeds a predetermined value.

15. A nuclear power reactor comprising:
a support frame;
a plurality of power modules movably connected to the support frame through a plurality of movement controllers, each of the plurality of power modules comprising a nuclear fuel and a power conversion system configured to convert heat generated from the nuclear fuel to electricity, the nuclear fuels of the plurality of power modules collectively forming a reactor core;
a sleeve disposed between the plurality of power modules, the sleeve being structurally connected to the support frame;
a reactivity quencher movably disposed in the sleeve and movable between a first end portion and a central portion of the sleeve, the reactivity quencher being configured to provide a negative nuclear reactivity to the reactor core; and
a plurality of module separators each connected to the sleeve and one of the plurality of power modules and extendable to move the one of the plurality of power modules away from the sleeve.

16. The nuclear power reactor of claim 15, further comprising a reactivity booster movably disposed in the sleeve and movable along the sleeve between a second end portion and the central portion of the sleeve, wherein the reactivity quencher comprises an internal recess adapted to receive the reactivity booster.

* * * * *